United States Patent
Lindgren

[15] 3,691,884
[45] Sept. 19, 1972

[54] TOOL POST

[72] Inventor: George V. Lindgren, 139 Highland St., Townsend, Mass. 01469

[22] Filed: Jan. 28, 1971

[21] Appl. No.: 110,660

Related U.S. Application Data

[63] Continuation-in-part of Ser. No. 576,325, Aug. 31, 1966, abandoned.

[52] U.S. Cl. .................................................82/36 R
[51] Int. Cl. ..............................................B23b 29/10
[58] Field of Search.....................................82/36, 37

[56]  References Cited

UNITED STATES PATENTS

| 1,366,366 | 1/1921 | Dover | 29/98 |
| 1,701,889 | 2/1929 | Junker | 82/1.4 |
| 2,557,454 | 6/1951 | Montgomery | 82/36 X |
| 3,062,080 | 11/1962 | Poorman | 82/36 X |

FOREIGN PATENTS OR APPLICATIONS

| 548,299 | 9/1956 | Italy | 82/36 |
| 569,498 | 10/1957 | Italy | 82/36 |

Primary Examiner—Leonidas Vlachos
Attorney—Norman S. Blodgett

[57]  ABSTRACT

This invention has to do with a tool post and, more particularly, a tool and support combination to be used on a lathe or the like, which is so arranged that the line of force caused by the operation of the tool is nearly linear through the device and the force is thereafter directed to the unyielding base of the machine. The invention further provides means for adjusting the presentation of the tool to the workpiece while still allowing the device to be returned to its rigid state.

5 Claims, 7 Drawing Figures

PATENTED SEP 19 1972

INVENTOR.
GEORGE V. LINDGREN
BY Albert A. Mahassel
ATTORNEY

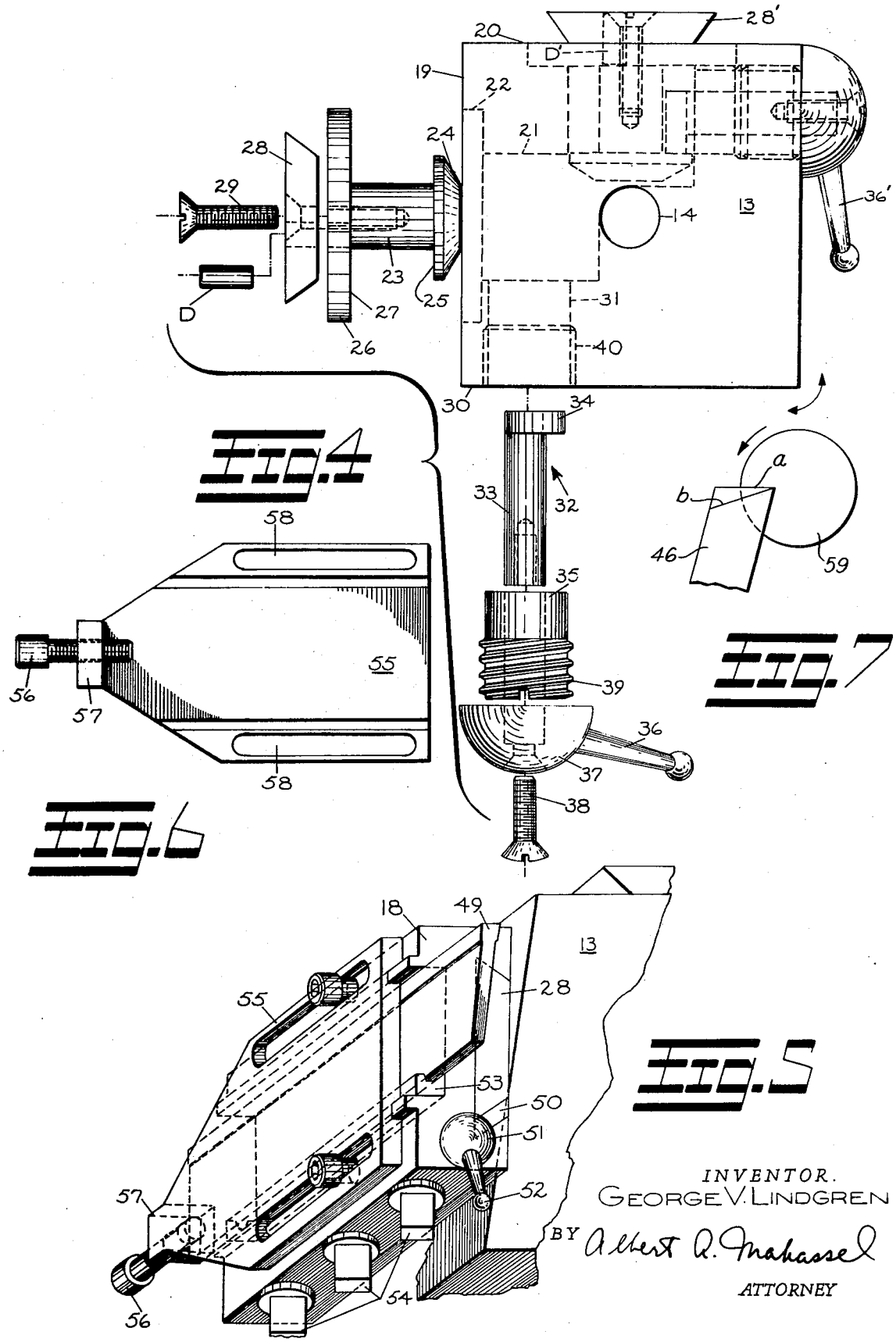

TOOL POST

This application is a continuation-in-part of U.S. Pat. Application Ser. No. 576,326, filed Aug. 31, 1966, and now abandoned.

This invention relates to a tool post, and more particularly, to a tool post for an engine or turret lathe.

Conventional tool posts for lathes support the cutting tool in a horizontal position and in a manner whereby the tool overhangs necessarily to a certain extent from the tool holder, and the latter in turn extends forwardly of the clamping means which fastens it to the lathe cross slide. This type of tool mounting oftentimes results in chattering with a resulting poor finish on the workpiece. The lack of adequate support also limits the amount of material which can be removed in a single cut. Also, in the case where carbide tools are used, the chattering frequently results in chipping or cracking of the tool.

According to the present invention, all of the above-mentioned disadvantages are overcome by the provision of a tool post which clamps the cutting tool in a more rigid manner while at the same time permitting the tool to be set in any combination of positions or angles with respect to the workpiece, thereby allowing the operator to utilize the most desirable relative setting for the particular tool to be used.

In a preferred embodiment of the invention the tool post includes two separate mounting means whereby two different tools may be individually mounted to perform two different cutting operations, each of the mounting means being able to be set relative to the workpiece independently of the other.

The tool post generally includes a block or housing of rectangular or square shape which is attached to the cross slide of the lathe and is held rigidly in place by means of a vertically extending T-bolt passing through the center of the block. Each of two vertical faces of the block has attached thereto a tool holder which is rotatable upon a horizontal axis. The tool post itself is rotatable about its locking T-bolt and may be locked in any such desired position. Thus, it will be apparent that the tool holder and tool may be located in any angular position in either a horizontal or vertical plane as will become more apparent from the detailed description to follow. Preferably, the tool is mounted in a vertical position whereby the cutting forces are directed downwardly along the length of the tool and through the immediately adjacent tool holder, and from there into the tool post and lathe cross slide. Since the tool, tool holder, tool post and cross slide are all closely integrated, chattering is impossible and substantially greater amounts of stock can be removed from the workpiece than when a conventional horizontally mounted tool is used, particularly due to the fact that skiving of metal may thereby be achieved.

It is the general object of the invention to provide a tool post for lathes and allied machines which makes possible a greater amount of material removal from a workpiece and which eliminates the possibility of any chattering.

It is a further object to provide a tool post adapted simultaneously to support two different types of cutting tools, each of which may be adjustably positioned about both horizontal and vertical axes.

It is a more specific object to provide a tool post wherein the cutting tool is mounted in a substantially vertical position in those operations involving turning, facing, cutting off, threading, knurling or forming, the tool being more solidly anchored to the supporting cross slide of the lathe, thereby permitting an increase in cutting speed and material removal.

It is still another object to provide a tool post which is adapted to support any variety of cutting tools which it may be desired to use in the various machining operations on a lathe, and wherein a change from one type of tool to another may take place in a very short period of time, the tool post also permitting horizontal mounting of the cutting tool for boring, drilling or reaming operations.

Further object and advantages will be apparent from the following more detailed description and from the figures of drawing, wherein:

FIG. 4 is a partially exploded plan view of the tool post of FIG. 1;

FIG. 5 is a partial perspective view of the tool post illustrating a modification of the tool holder which may be used in conjunction therewith for supporting a different cutting tool;

FIG. 6 is an elevation view of a part of the tool support of FIG. 5; and

FIG. 7 is a side elevation view looking from the opposite side of FIG. 1 and illustrating how skiving of metal is accomplished.

Figure 1:
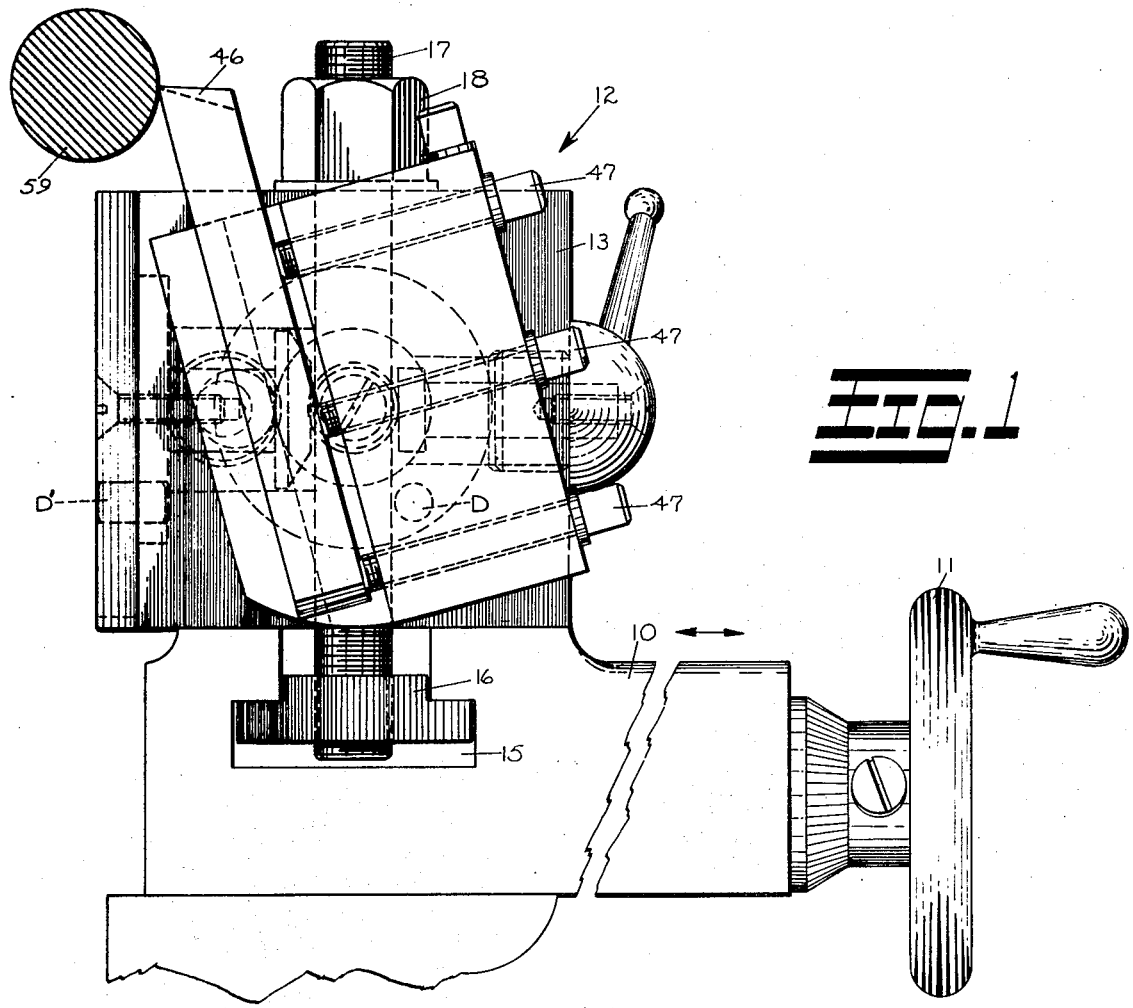
FIG. 1 is a side elevation view of a lathe cross slide showing the tool post attached thereto, and also illustrating the relative positions of the cutting tool and workpiece.

In FIG. 1 a lathe cross slide is shown at 10 having a control wheel 11 for effecting movement of the cross slide of the lathe in the direction of the arrows.

The tool post according to the invention is generally indicated by the arrow 12 and comprises a supporting block 13 which may be in the shape of a cube although not necessarily so. Its heighth and side dimensions may vary according to the size of the lathe with which it is to used. The post has a central opening 14 extending vertically therethrough by means of which it is anchored via a T-slot 15 to the cross slide by means of a T-plate 16, bolt 17 and lock nut 18. See FIGS. 1 and 4. The block may be selectively positioned and locked in any desired angular position about its vertical axis by rotation thereof in a clockwise or counter-clockwise direction as seen in FIG. 4.

The tool post has provisions for mounting two separate tool holders thereon, one adjacent each of the vertically extending faces 19 and 20 of the block. Since each tool holder is a duplicate of the other, a detailed description of only one need be given and corresponding parts will be denoted in the other by similar reference numerals in primes.

Face 19 of the block 13 is provided with a centrally located, horizontally extending circular opening 21 which is enlarged for a short span adjacent face 19 as indicated at 22. A cam lock spindle 23 is receivable into said opening and includes an enlarged inner portion 24 having a cam engaging shoulder 25, and a still greater enlarged outer portion 26 the inner arcuate portion of which forms a further cam engaging shoulder 27. A male dovetail slide 28 is secured to the outer face of spindle 23 by means of a flat head screw 29 recessed into the slide and threadably engaged with the spindle. A dowel pin D is also preferably used to lock these two members together. The spindle and its attached dovetail slide are pivotable on the horizontal axis of the spindle within the opening 21 and are selectively locked in any desired position by a locking means next to be described.

The vertical face 30 adjacent the face 19 is provided with a further horizontally extending opening 31 which communicates at its inner end with opening 21. A cam lock 32 comprising a cylindrical cam support 33 and an integral cam 34 at the inner end thereof is receivable into the opening between the shoulders 25 and 27. The cam lock has a sliding fit with a cam lock bushing 35 and is affixed to handle 36 and handle support 37 by a screw 38 threadably receivable into cam support 33. A key (not shown) may optionally be used to provide an additional lock between cam support 33 and handle support 37. In turn, the cam lock and its attached members are held in block 13 by engagement of threaded portion 39 of the lock bushing 35 with mating threaded portion 40 provided in block 13.

When assembled in the manner illustrated with respect to the dovetail slide and the cam lock assembly on the opposite two faces of block 13 as seen in FIG. 4, it will be apparent that the dovetail slide may be selectively locked in any desired angular position against the outer face of portion 26 by a slight clockwise rotation of handle 36.

Similarly, a one half conterclockwise turn of handle 36 will cause cam34 to engage shoulder 27 thereby releasing dovetail slide 28.

Figure 2:
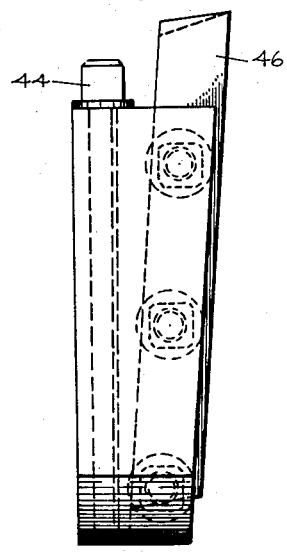
FIG. 2 is an elevation view of the tool holder and the cutting tool of FIG. 1 as seen from the left hand side thereof.
Figure 3:
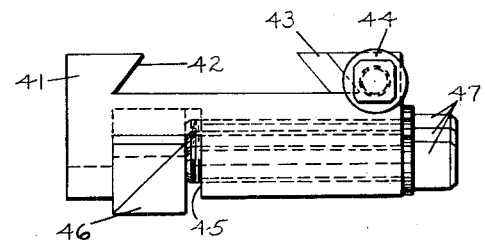
FIG. 3 is a plan view of FIG. 2.

A cutting tool is mounted on the dovetail slide by way of a tool support which includes a mating dovetail member and which is designed to accomodate the type of tool to be used. One such support is shown in FIGS. 2 and 3 and comprises a tool support 41 having a dovetail 42 adapted to mate with dovetail slide 28 of the tool post. A tapered gib 43 and elevating screw 44 permit the securing of the tool holder to the slide of the tool post as well as vertical adjustment of the tool in relation to the centerline of the lathe. The side of the tool support opposite the dovetail is provided with a generally rectangular recess 45 extending lengthwise thereof and in parallel relation to the dovetail. The recess has an angular relationship to the dovetail to provide for a slight angular outward tilt of a turning or facing tool 46 which is held therein by three screws 47.

Another type of tool holder is illustrated at 48 in FIG. 6 and which is particularly adapted for supporting a cutting off tool 49. This tool holder also includes a mating dovetail and a tapered gib 50 with an elevating screw 51 here shown with an operating handle 52. The tool receiving recess in this case is somewhat wider cutting off tool and includes a lengthwise extending, recessed adaptor 53 into which the rear vertical edge of the tool is receivable. Screws 54 lock the tool in position. A cap member 55 is illustrated in plan in FIG. 6 is attachable to the outer face of this tool holder and includes a vertically extending, adjustable allen screw 56 threaded into a horizontal extension 57 integral with the lower part of the cap member. A pair of elongated slots 58 provide for adjustable attachment to the tool holder. The cap member aids in stiffening this cut off tool and also gives additional vertical support thereto.

In FIG. 7 a tool 46' is shown which is so sharpened as to effect skiving of a workpiece 59. Applicant has discovered that particularly unusual and unexpected results occur when metal is cut in the manner illustrated in FIG. 7. In this type of cutting the workpiece is mounted in a collet or chuck and the tool 46 is advanced toward the workpiece from its free end. The tool 46' is so sharpened as to present a generally horizontally extending cutting edge 'a' on that side of the tool which is closest to the workpiece and receding as indicated at 'b' to the opposite side of the tool to provide the desired shear and rake angles. The vertical mounting of the tool and the fact that the cutting action is taking place on what is normally the end surface of the tool rather than its top surface permits the taking of substantially larger and heavier cuts with better finishes on the workpiece due to vibration elimination attendant with conventionally mounted tools with a less rigid mounting.

From the above description it will be apparent that the tool to be mounted in the tool post of this invention may be set in practically any desired angle with respect to the workpiece. Preferably, as noted in FIG. 1 the tool is mounted in a substantially vertical position with respect to the workpiece 59 so that the cutting forces are directed downwardly through solidly attached members to the cross slide. The cutting edge of the tool is tilted forwardly approximately 15° for proper clearance at the descretion of the operator. It may, of course, be adjusted to any position about the horizontal axis of spindle 23. Similarly, rotation of the tool post about its vertical axis permits a corresponding adjustment of the tool.

Horizontal mounting of the cutting tool is obviously also possible for boring, drilling, reaming and similar operations.

I claim:

1. A tool post for lathes which comprises
   a. a support block adapted to be attached directly to a lathe cross feed member in a vertically extending position,
   b. an elongated cutting tool having an end face shaped to operate on a workpiece,
   c. a support means abutting said support block and carrying said cutting tool in a position tangential to the surface of the workpiece, and rendering the tool inflexible with respect to the support block, and
   d. means to allow the tool to be rendered flexible with respect to the support block, at that time adjustable on horizontal and vertical axis and thereafter inflexible, the said support means being mounted on said support block by means of mating dovetail members, said dovetail members being attached to a pivotable spindle for adjustable positioning about a horizontal axis.

2. A tool post according to claim 1, wherein the said block is adjustably positionable about a vertical axis passing through the center thereof.

3. A tool post according to claim 1, wherein said dovetail members are releasably secured to the block by a cam, and hand operable means for controlling said cam between locking and releasing positions.

4. A tool post according to claim 1, wherein said support block includes a plurality of vertically extending side faces, and tool supports mounted on at least two of said side faces.

5. A tool post for lathes, comprising
   a. a support block for attachment directly to a lathe cross feed member and having at least one vertical plane surface,
   b. a vertical shaft extending into the block for adjustment about a vertical axis,
   c. a tool support means mounted on the block in engagement with the said vertical plane surface, and
   d. a horizontal shaft extending into the block and providing for adjustment of the tool support means about a horizontal axis, the tool support means consisting of an inner part which lies next to the said surface and an outer part having means to hold a cutting tool in a position tangential to the surface of the workpiece, the inner and outer parts being slidably interengaged for relative adjustment in a straight line in a direction lengthwise of the tool.

* * * * *